(12) United States Patent
Kawakami et al.

(10) Patent No.: US 10,302,185 B2
(45) Date of Patent: May 28, 2019

(54) OIL PASSAGE STRUCTURE FOR POWER TRANSMISSION DEVICE

(71) Applicants: TOYOTA JIDOSHA KABUSHIKI KAISHA, Toyota-shi (JP); TOYODA GOSEI CO., LTD., Kiyosu-shi (JP)

(72) Inventors: Takaho Kawakami, Susono (JP); Motoki Tabuchi, Mishima (JP); Shinya Sakai, Kiyosu (JP); Katsuhisa Ota, Kiyosu (JP); Tatsuya Hirano, Kiyosu (JP); Yoshito Arihata, Kiyosu (JP)

(73) Assignees: TOYOTA JIDOSHA KABUSHIKI KAISHA, Toyota-shi (JP); TOYOTA GOSEI CO., LTD., Kiyosu-shi (JP)

( * ) Notice: Subject to any disclaimer, the term of this patent is extended or adjusted under 35 U.S.C. 154(b) by 38 days.

(21) Appl. No.: 15/728,538

(22) Filed: Oct. 10, 2017

(65) Prior Publication Data

US 2018/0106357 A1    Apr. 19, 2018

(30) Foreign Application Priority Data

Oct. 14, 2016   (JP) .................................. 2016-203002

(51) Int. Cl.
*F16H 57/04*    (2010.01)
*F16H 48/08*    (2006.01)
*F16H 57/02*    (2012.01)

(52) U.S. Cl.
CPC ......... *F16H 57/0423* (2013.01); *F16H 48/08* (2013.01); *F16H 57/0479* (2013.01);
(Continued)

(58) Field of Classification Search
None
See application file for complete search history.

(56) References Cited

U.S. PATENT DOCUMENTS 3,495,298 A * 2/1970 Engle ...................... F16H 48/08
                                                          184/11.1
3,533,488 A * 10/1970 Jeakle ...................... F16H 48/08
                                                          184/11.1

(Continued)

FOREIGN PATENT DOCUMENTS

| JP | 09-026018 | 1/1997 |
| JP | 2014-190528 | 10/2014 |
| JP | 2016-041979 | 3/2016 |

*Primary Examiner* — Colby M Hansen
(74) *Attorney, Agent, or Firm* — Oblon, McClelland, Maier & Neustadt, L.L.P.

(57) ABSTRACT

In an oil passage structure for a power transmission device including a case provided to accommodate a power transmission device, a baffle plate attached to an inner wall of the case, and an oil pump, the oil passage structure includes a supply oil passage through which oil is pumped from the oil pump to an oil supply destination via the baffle plate. The baffle plate has a structure in which two members of a plate body and a plate-shaped auxiliary member are superposed and integrated with each other. The baffle plate is provided with a plate oil passage that constitutes a portion of the supply oil passage and passes through the inside of the baffle plate. The plate oil passage is formed by a recess provided in at least one of a surface of the plate body and a surface of the auxiliary member which face to each other such that the auxiliary member is interposed on the plate body.

10 Claims, 9 Drawing Sheets

(52) U.S. Cl.
CPC ...... *F16H 57/0445* (2013.01); *F16H 57/0471* (2013.01); *F16H 57/0483* (2013.01); *F16H 2057/02091* (2013.01); *F16H 2057/02095* (2013.01)

(56) References Cited

U.S. PATENT DOCUMENTS

| | | | | |
|---|---|---|---|---|
| 5,098,360 A | * | 3/1992 | Hirota | F16H 48/08 |
| | | | | 475/231 |
| 2012/0316024 A1 | * | 12/2012 | Weber | F16H 57/0409 |
| | | | | 475/160 |
| 2017/0102065 A1 | | 4/2017 | Ohmura et al. | |

* cited by examiner

OIL PASSAGE STRUCTURE FOR POWER TRANSMISSION DEVICE

INCORPORATION BY REFERENCE

The disclosure of Japanese Patent Application No. 2016-203002 filed on Oct. 14, 2016 including the specification, drawings and abstract is incorporated herein by reference in its entirety.

BACKGROUND

1. Technical Field

The present disclosure relates to an oil passage structure for a power transmission device.

2. Description of Related Art

Lubrication-needing sites that need lubrication using oil, such as engagement parts of gears and bearings, are provided inside a case provided to accommodate a power transmission device. As methods of supplying oil to the lubrication-needing sites, a method of pumping oil with an oil pump and oil passages, and a method (scooping lubrication) of scooping oil with a differential ring gear of a differential gear mechanism are known.

Japanese Unexamined Patent Application Publication No. 09-026018 (JP 09-026018 A) discloses, as the method of pumping oil, connecting a supply pipe to oil passages formed in a case and installing the supply pipe inside the case to directly supply oil from the supply pipe to the lubrication-needing sites.

Japanese Unexamined Patent Application Publication No. 201641979 (JP 2016-41979 A) discloses providing a baffle plate inside a case, which suppresses scattering of lubricating oil when oil is scooped by the differential ring gear of the differential gear mechanism, as a configuration in which oil is scooped to lubricate.

SUMMARY

However, in the configuration described in JP 09-026018 A, the supply pipe should be installed so as to avoid elements provided inside the case. For example, in a case where the differential gear mechanism is used as an oil supply destination, the supply pipe is installed so as to bypass the baffle plate described in JP 2016-41979 A. In this way, in the configuration in which the supply pipe is provided inside the case, there is a possibility that oil passage length may become long and the pressure loss of oil may become large.

The disclosure provides an oil passage structure for a power transmission device where the pressure loss of oil can be reduced.

An aspect of the disclosure relates to an oil passage structure for a power transmission device, the oil passage structure including a case provided to accommodate the power transmission device; a baffle plate attached to an inner wall of the case; an oil pump; and a supply oil passage through which oil is pumped from the oil pump to an oil supply destination via the baffle plate. The baffle plate includes a plate body, and an auxiliary member which is plate-shaped, and which is superposed on and integrated with the plate body. The baffle plate has a plate oil passage, a supply port and a discharge port. The plate oil passage is an oil passage that constitutes a portion of the supply oil passage and passes through the inside of the baffle plate. The supply port is configured to allow the oil discharged from the oil pump to flow into the plate oil passage through the supply port. The discharge port is configured to allow the oil supplied to the oil supply destination to be discharged from the plate oil passage through the discharge port. The plate oil passage is defined by a recess provided in at least one of a surface of the plate body and a surface of the auxiliary member which face to each other such that the auxiliary member is interposed on the plate body.

According to the aspect, oil can be pumped via the oil passage provided in the baffle plate. For that reason, unlike the related art, there is no need for installing a supply pipe so as to bypass the baffle plate. Accordingly, it is possible to make the oil passage length of the supply oil passage shorter than that of an oil passage that bypasses the baffle plate, and the pressure loss of oil caused by the oil passage, a length of which is long, can also be reduced. Additionally, the plate oil passage is formed by the recess provided in at least one of the surface of the plate body and the surface of the auxiliary member which face to each other. That is, since the plate oil passage is formed by superposing and integrating the plate body and the auxiliary member with each other, the oil passage can be easily formed in the baffle plate.

In the oil passage structure according to the aspect, the plate body may have a tubular part, and a flange part that extends radially outwardly from the tubular part. The auxiliary member may be superposed on and integrated with the flange part, and may extend in a circumferential direction of the baffle plate. The plate oil passage may extend in the circumferential direction of the baffle plate, and the discharge port may be provided at a position that is different in the circumferential direction of the baffle plate from a position at which the supply port is provided, such that oil is supplied to the oil supply destination.

According to the aspect, since the auxiliary member is formed in the circumferential direction, the rigidity of the baffle plate can be enhanced by the rigidity of the auxiliary member. Moreover, since the supply port and the discharge port are provided at different positions in the circumferential direction of the baffle plate, oil is pumped toward the different positions in the circumferential direction of the baffle plate when oil flows through the inside of the baffle plate. Additionally, since the plate oil passage extends in the circumferential direction of the baffle plate, the pressure loss of oil caused by an oil passage shape can be reduced, for example, compared to a right-angled curve in which an oil passage is steeply curved.

In the oil passage structure according to the aspect, at least one of plate body and the auxiliary member may be a member made of resin, and an orifice or a choke structure may be provided in a portion that forms the plate oil passage, in the member made of the resin.

According to the aspect, manufacture becomes easy by providing the orifice or the choke structure in the member made of resin out of the members that form the plate oil passage.

In the oil passage structure according to the aspect, the oil supply destination may include a first oil supply destination and a second oil supply destination at different positions inside the case. The discharge port may include a first discharge port that allows the oil supplied to the first oil supply destination to be discharged through the first discharge port, and a second discharge port that allows the oil supplied to the second oil supply destination to be discharged through the second discharge port. The plate oil passage may branch to an oil passage that leads from the supply port to the first discharge port, and an oil passage that leads from the supply port to the second discharge port.

According to the aspect, oil can be supplied to a plurality of oil supply destinations by the plate oil passage formed in the baffle plate. Accordingly, there is no need for providing a supply pipe for each oil supply destination, and the number of parts can be reduced.

In the oil passage structure according to the aspect, the plate oil passage may be an oil passage that allows the oil to be supplied through the oil passage to a lubrication-needing portion where lubrication by the oil is needed in the power transmission device. The first oil supply destination may be a constituent element of a differential gear mechanism included in the power transmission device. The second oil supply destination may be a constituent element separate from the differential gear mechanism in the power transmission device. The first discharge port may be provided at a position where oil is directly supplied to the first oil supply destination. The second discharge port may be provided at a position where oil is directly supplied to the second oil supply destination.

According to the aspect, oil can be supplied to the differential gear mechanism by the plate oil passage, and oil can be supplied to the constituent element disposed on the axis different from the differential gear mechanism.

In the oil passage structure according to the aspect, the oil supply destination may further include a third oil supply destination that is a differential pinion gear and a differential side gear that constitute the differential gear mechanism. The discharge port may further include a third discharge port provided at a position where oil is directly supplied to the third supplied portion. The plate oil passage may branch to an oil passage that leads from the supply port to the first discharge port, and an oil passage that leads from the supply port to the third discharge port. The first oil supply destination may be a differential bearing that supports a differential case accommodating the differential pinion gear and the differential side gear on the case. The baffle plate may be disposed so as to cover the differential case.

According to the aspect, the baffle plate is provided with the plate oil passage supplied to the oil supply destination and the discharge ports provided in respectively different lubrication-needing portions. Therefore, lubricating oil can be easily supplied to elements that run short of lubricating oil. Moreover, the number of oil passages can be reduced while compensating for the shortage of lubricating oil in the lubrication-needing portions. For that reason, the manufacturing costs can be suppressed.

In the oil passage structure according to the aspect, the plate oil passage may be a lubricating oil passage that allows oil to be supplied through the lubricating oil passage to a constituent element of a differential gear mechanism included in the power transmission device, and an oil passage that allows hydraulic pressure of oil to be supplied through the oil passage to a hydraulic actuator included in the power transmission device. The baffle plate may be provided on an axis where the differential gear mechanism is disposed. The first oil supply destination may be a constituent element of the differential gear mechanism. The second o oil supply destination may be the hydraulic actuator. The first discharge port may be provided at a position where oil is directly supplied to the first oil supply destination.

According to the aspect, the oil supply destination via the supply oil passage may include both the lubrication-needing portions and the hydraulic actuator. Accordingly, the application range of the baffle plate can be expanded.

In the oil passage structure according to the aspect, a direction in which the supply port opens may be a direction opposite to a direction in which the first discharge port opens.

In the oil passage structure according to the aspect, a direction in which the supply port opens may be the same as a direction in which the second discharge port opens.

In the oil passage structure according to the aspect, the baffle plate may have a second plate oil passage that is an oil passage independent from the plate oil passage, the second plate oil passage allowing oil to be pumped through the second plate oil passage to an oil supply destination different from the oil supply destination via the plate oil passage. The second plate oil passage may be defined by a recess provided in at least one of a surface of the plate body and a surface of the auxiliary member which face to each other such that the auxiliary member is interposed on the plate body.

According to the aspect, oil can be pumped to a plurality of oil supply destinations by the independent plate oil passages formed in the baffle plate. Accordingly, there is no need for providing a supply pipe for each oil supply destination, and the number of parts can be reduced.

According to the aspect, oil can be pumped via the oil passage provided in the baffle plate. Accordingly, it is possible to make the oil passage length of the supply oil passage shorter than that of an oil passage that bypasses the baffle plate, and the pressure loss of oil caused by the oil passage length can also be reduced.

BRIEF DESCRIPTION OF THE DRAWINGS

Features, and advantages, and technical and industrial significance of exemplary embodiments will be described below with reference to the accompanying drawings, in which like numerals denote like elements, and wherein.

DETAILED DESCRIPTION OF EMBODIMENTS

Hereinafter, oil passage structures of power transmission devices in embodiments will be specifically described with reference to the drawings.

1. Overall Configuration

Figure 1:
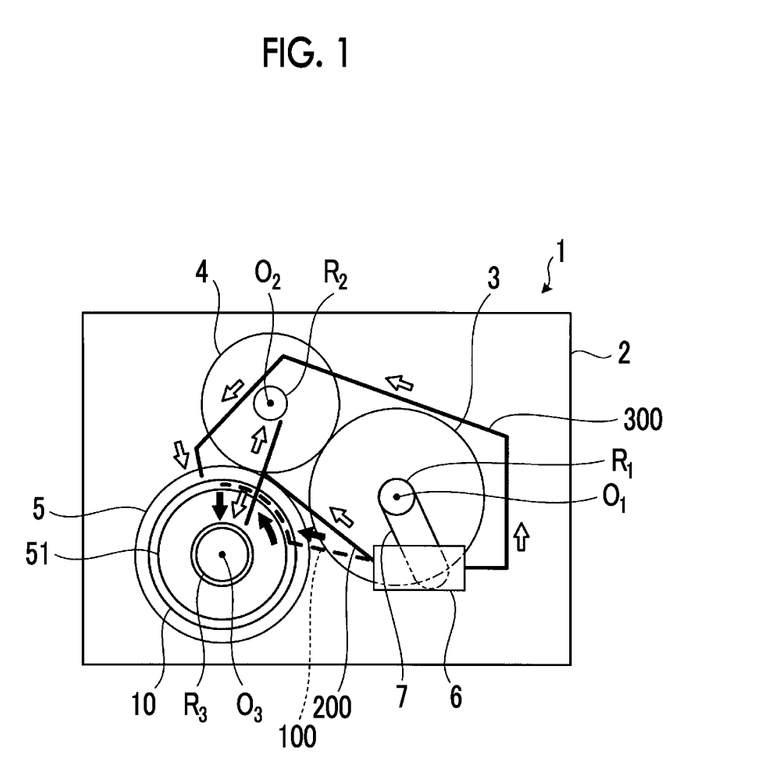
FIG. 1 is a schematic view for illustrating an oil passage structure for a power transmission device in an embodiment.

FIG. 1 is a schematic view for illustrating an oil passage structure for a power transmission device in an embodiment. In addition, for convenience of description, oil passages (a supply pipe 300 of the related art, an oil passage 200 that is the shortest path), which are not included in the embodiment, are illustrated in FIG. 1.

1-1. Power Transmission Device

A power transmission device 1 is a mechanism that is mounted on a vehicle in a state where the power transmission device is accommodated in a case 2 and that transmits the power, which is output from an engine, to the driving wheels. The power transmission device 1 illustrated in FIG. 1 is mounted on a front engine front drive type vehicle (FF vehicle), and includes a transmission 3, a counter gear mechanism 4, and a differential gear mechanism 5 which are accommodated in the case 2. That is, the case 2 is a transaxle case (T/A case) that accommodates the transmission 3 and the differential gear mechanism 5. In the power transmission device 1, power is transmitted from the transmission 3 to the differential gear mechanism 5 via the counter gear mechanism 4 on a power transmission path that leads from the engine to the driving wheels.

In detail, the power transmission device 1 has a plurality of rotary shafts. A first shaft $R_1$, a second shaft $R_2$, and a third shaft $R_3$, which constitute the power transmission device 1, are provided inside the case 2. The transmission 3 is provided on the first shaft $R_1$ on the same axis as the engine, and includes an input shaft and an output gear having a first axis $O_1$ as a rotation center. For example, the transmission 3 is constituted of a planetary gear mechanism. The counter gear mechanism 4 is provided on the second shaft $R_2$. The differential gear mechanism 5 is provided on the third shaft $R_3$, and has the right and left driving wheels (front wheels) connected thereto via a driving shaft. That is, the input shaft of the transmission 3 is included in the first shaft $R_1$, a countershaft 41 (illustrated in FIG. 3) of the counter gear mechanism 4 is included in the second shaft $R_2$, and the driving shaft is included in the third shaft $R_3$. In the description, an axis center of the first shaft $R_1$ is described as the first axis $O_1$, an axis center of the second shaft $R_2$ is described as the second axis $O_2$ and an axis center of the third shaft $R_3$ is described as a third axis $O_3$.

Additionally, a baffle plate 10, which restricts a flow direction of oil around the third axis $O_3$, and a differential case 51 of the differential gear mechanism 5 are provided inside the case 2. The baffle plate 10 is disposed outside the differential case 51 around the differential gear mechanism 5 that is an oil supply destination. In addition, a detailed structure of the baffle plate 10 will be described below.

Moreover, a mechanical oil pump 6 driven by the engine is provided as an oil supply source inside the case 2. The mechanical oil pump 6 is disposed on a separate shaft from the first shaft $R_1$, and is connected so as to be capable of transmitting the torque of the first shaft $R_1$ via a power transmission device 7, such as a chain mechanism. In addition, the mechanical oil pump 6 may be provided on the same axis as the first axis $O_1$.

1-2. Oil Passage Structure

Here, the oil passage structure of the embodiment will be compared with a related art structure. First, the supply pipe 300 of the related art structure is installed so as to bypass the outside of the differential case 51 in order to supply oil from the mechanical oil pump 6 to the differential gear mechanism 5. Additionally, since the differential gear mechanism 5 is provided on the third shaft $R_3$, the supply pipe 300 extends up to the periphery of the third shaft $R_3$ so as to bypass the outside of the first shaft $R_1$ and the second shaft $R_2$ and run along a wall surface of the case 2. For that reason, in the supply pipe 300 of the related art, oil passage length becomes longer, and the pressure loss of oil caused by the oil passage length becomes larger. Thus, in order to shorten the oil passage length, it is considered that an oil passage (hereinafter referred to as a "shortest oil passage") 200 of the shortest path is formed.

The shortest oil passage 200 becomes a path that is linear in its entirety from the mechanical oil pump 6 toward the differential gear mechanism 5. However, many elements (peripheral members), such as bearings and reinforcing ribs, are present around the oil supply destination, and the structure is complicated. For that reason, it is difficult to realize the shortest oil passage 200 by providing a discharge port at a position where oil can be supplied to the oil supply destination and connecting the linear oil passage so as to connect the position of the discharge port and the mechanical oil pump 6 together. Then, it is considered that the linear oil passage is connected so as to avoid the peripheral members. In this case, however, a right-angled curve in which the oil passage is steeply curved is formed, and thus, the pressure loss of oil caused by an oil passage shape becomes larger. Thus, a supply oil passage 100 of the present embodiment is configured so as to provide a curvilinear oil passage around the oil supply destination to reduce the pressure loss of oil caused by the oil passage shape and to realize a path closer to the shortest oil passage 200 than the supply pipe 300 of the related art to reduce the pressure loss caused by the oil passage length.

The supply oil passage 100 of the present embodiment is configured such that oil is pumped from the mechanical oil pump 6 to the differential gear mechanism 5 via the cylindrical baffle plate 10. The baffle plate 10 is a baffle plate with an oil passage in which the oil passage extending in a circumferential direction within a plate is formed. Additionally, the baffle plate 10 is disposed around the oil supply destination. For that reason, in the supply oil passage 100, it is possible to pump oil using the oil passage extending in the circumferential direction inside the baffle plate 10 around the oil supply destination. That is, the oil passage extending in the circumferential direction around the oil supply destination is constituted of the baffle plate 10 that is a peripheral member of the oil supply destination. Accordingly, the pressure loss of oil caused by the oil passage shape can be reduced. Additionally, the supply oil passage 100 becomes a path closer to the shortest oil passage 200 than the supply pipe 300 of the related art. As illustrated in FIG. 1, as seen from an axial direction, the supply pipe 300 is provided outside the rotary shafts (the first shaft $R_1$, the second shaft $R_2$, and the third shaft $R_3$). However, the supply oil passage 100 is provided so as to pass between the first shaft $R_1$ inside the rotary shafts, that is, on the oil supply source side, and the third shaft $R_3$ on the oil supply destination side (and further between the second shaft $R_2$ and the third shaft $R_3$). For this reason, the oil passage length of the supply oil passage 100 becomes shorter than that of the supply pipe 300. Accordingly, the pressure loss of oil caused by the oil passage length can be reduced.

2. Arrangement of Baffle Plate and Oil Suppled Portion

Figure 2:
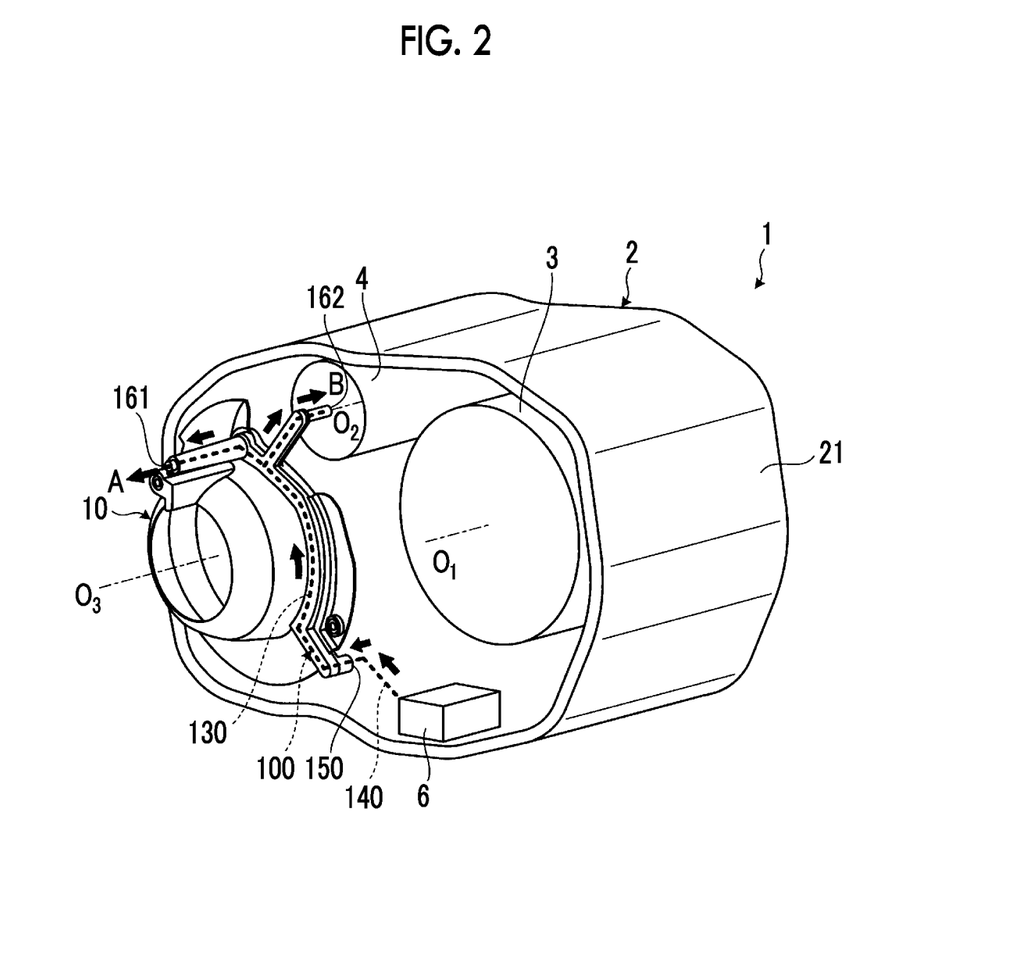
FIG. 2 is a schematic view for illustrating the arrangement of a baffle plate.
Figure 3:
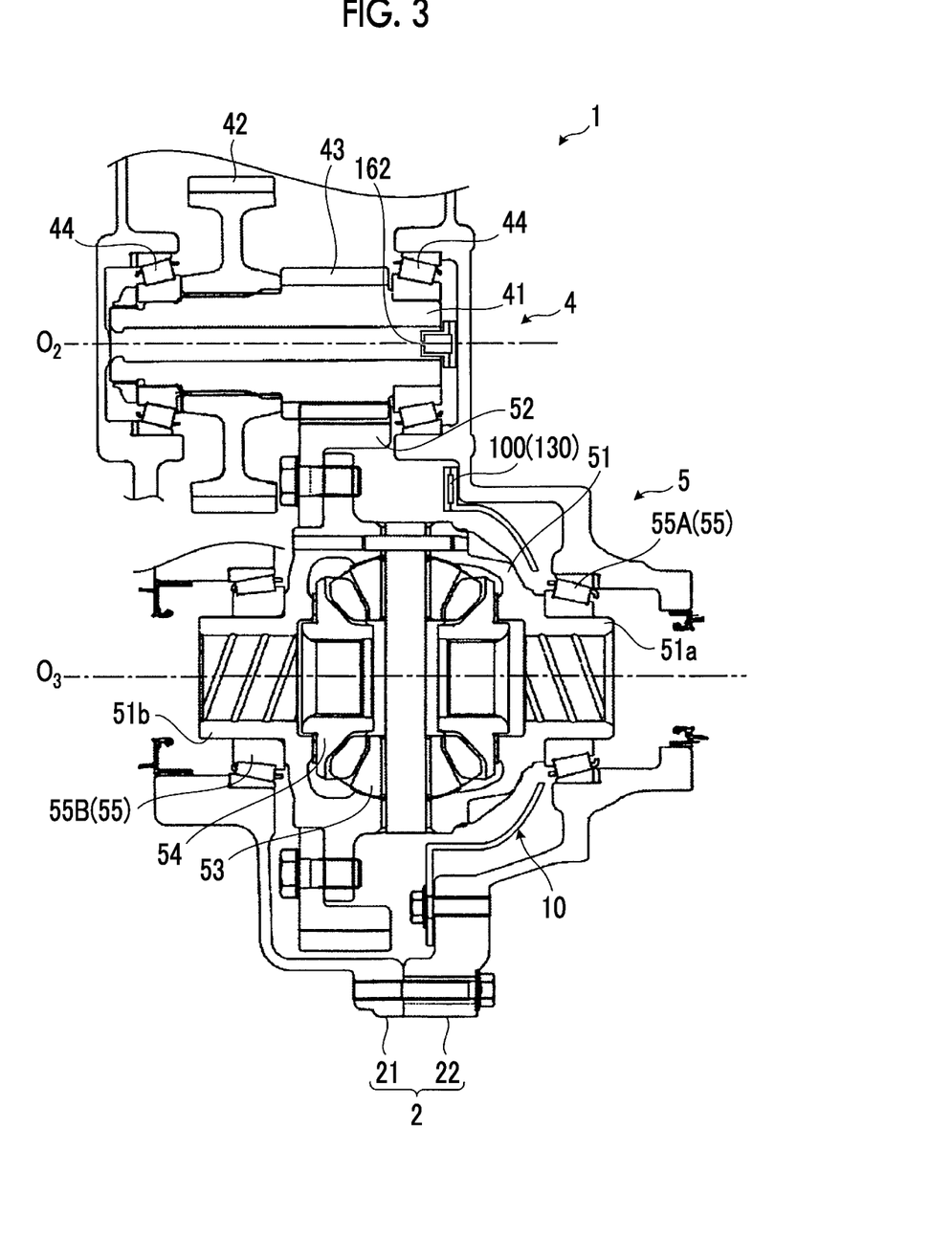
FIG. 3 is a sectional view schematically illustrating an internal structure of a case.

The arrangement of the baffle plate 10 and the oil supply destination will be described with reference to FIG. 2 and FIG. 3. FIG. 2 is a schematic view for illustrating the arrangement of the baffle plate 10. FIG. 3 is a sectional view schematically illustrating an internal structure of the case 2. In addition, the differential gear mechanism 5 is not illustrated in FIG. 2, and a portion of the case 2 is illustrated.

2-1. Arrangement of Baffle Plate

The baffle plate 10 is disposed around the third axis $O_3$ inside the case 2, and is formed in a tubular shape having a predetermined length in the axial direction. Additionally, as illustrated in FIG. 3, the baffle plate 10 is a fixing member attached to an inner wall of the case 2, and is disposed between the differential case 51 and the case 2. The differential gear mechanism 5 including the differential case 51 is the oil supply destination. That is, the baffle plate 10 is attached to the inner wall of the case 2 around the oil supply destination.

The case 2 includes a tubular main case body 21 that accommodates the transmission 3, and two cover members 22 attached to the openings on both sides of the main case body 21. As illustrated in FIG. 3, the main case body 21 and the cover members 22 are fastened with a bolt and integrated with each other. In an example illustrated in FIG. 3, the cover member 22 is a front cover disposed on the engine side in the axial direction, and the baffle plate 10 is fastened to an inner wall of the cover member 22 with a bolt. In addition, in a case where the main case body 21 and the cover member 22 are not particularly distinguished from each other, the main case body 21 and the cover member 22 are described as the case 2.

2-2. Oil Supply Destination

As illustrated by dashed lines in FIG. 2, the supply oil passage 100 is constituted of a path through which oil is pumped from the mechanical oil pump 6 driven by the engine to oil supply destinations via the baffle plate 10. In detail, the supply oil passage 100 includes a plate oil passage 130 that passes through the inside of the baffle plate 10 and extends in the circumferential direction of the third axis $O_3$, and a case oil passage 140 that is an oil passage formed in the case 2. That is, a portion of the supply oil passage 100 is provided in the baffle plate 10. The case oil passage 140 constitutes the supply oil passage 100 between the mechanical oil pump 6 and the plate oil passage 130. Since the plate oil passage 130 on a downstream side and the case oil passage 140 on an upstream side communicate with each other, oil can be pumped from the mechanical oil pump 6 to the oil supply destinations. Moreover, a supply port 150 to which oil is supplied from the case oil passage 140, a first discharge port 161 for discharging oil to a first supply destination A that is an oil supply destination on the third axis $O_3$, and the second discharge port 162 for discharging oil to a second supply destination B that is an oil supply destination on the second axis $O_2$ are formed in the baffle plate 10.

The supply port 150 is a connection port connected to the case oil passage 140, and communicates with the plate oil passage 130. Additionally, all the supply port 150, the first discharge port 161, and the second discharge port 162 are provided at positions that are different from each other in the circumferential direction of the baffle plate 10. The plate oil passage 130 communicates with the supply port 150 and the first discharge port 161, and communicates with the supply port 150 and the second discharge port 162. Accordingly, the oil, which has flowed into the plate oil passage 130 (into the baffle plate 10) from the supply port 150, flows through the plate oil passage 130 in the circumferential direction, and is discharged to different oil supply destinations (the first oil supply destination A and the second oil supply destination B) from the first discharge port 161 and the second discharge port 162. That is, the supply oil passage 100 can supply oil to the oil supply destinations disposed on the different shafts via the baffle plate 10.

As illustrated in FIG. 3, the oil supply destinations of the supply oil passage 100 include a differential bearing 55 (the first supply destination A) that supports the differential case 51 on the same shaft as the baffle plate 10, the counter gear mechanism 4 (the second supply destination B) disposed on a separate shaft from the baffle plate 10, and a differential pinion gear 53 and a differential side gear 54 (a third supply destination C illustrated in FIGS. 5 and 8 to be described below) provided inside the differential case 51 on the same shaft as the baffle plate 10.

In detail, the differential gear mechanism 5 includes the differential case 51, a differential ring gear 52 that rotates integrally with the differential case 51, and the differential pinion gear 53 and the differential side gear 54 that are provided inside the differential case 51. An engagement part between the differential pinion gear 53 and the differential side gear 54 is a lubrication-needing site serving as the third supply destination C of the supply oil passage 100. The differential case 51 has boss parts 51a, 51b provided on both end sides in the axial direction, and is rotatably supported by the case 2 via the differential bearing 55 that is a rolling bearing. The differential bearing 55 includes a first differential bearing 55A attached to an outer peripheral part of one boss part 51a, and a second differential bearing 55B attached to an outer peripheral part of the other boss part 51b. The first differential bearing 55A is a lubrication-needing site serving as the first supply destination A of the supply oil passage 100, and is located outside the differential case 51. In the example illustrated in FIG. 3, the first differential bearing 55A is provided at a position close to a smaller-diameter-side opening of the baffle plate 10.

The counter gear mechanism 4 includes a hollow countershaft 41 disposed on the second axis $O_2$, a counter driven gear 42 that rotates integrally with the countershaft 41, and a counter drive gear 43. The countershaft 41 is rotatably supported by the case 2 via a counter bearing 44 that is a rolling bearing. The counter bearing 44 is included in a lubrication-needing site serving as the second supply destination B of the supply oil passage 100, that is, a lubrication-needing site on a separate shaft (the second shaft $R_2$ side). The counter driven gear 42 meshes with the output gear (not illustrated) of the transmission 3. The counter drive gear 43 meshes with the differential ring gear 52. The gear engagement parts are also included in the lubrication-needing site on the second shaft $R_2$ side. In the example illustrated in FIG. 3, the second discharge port 162 of the baffle plate 10 opens toward the inside of the countershaft 41, and supplies oil to the counter gear mechanism 4 that is the second supply destination B.

3. Structure of Baffle Plate

Figure 4:
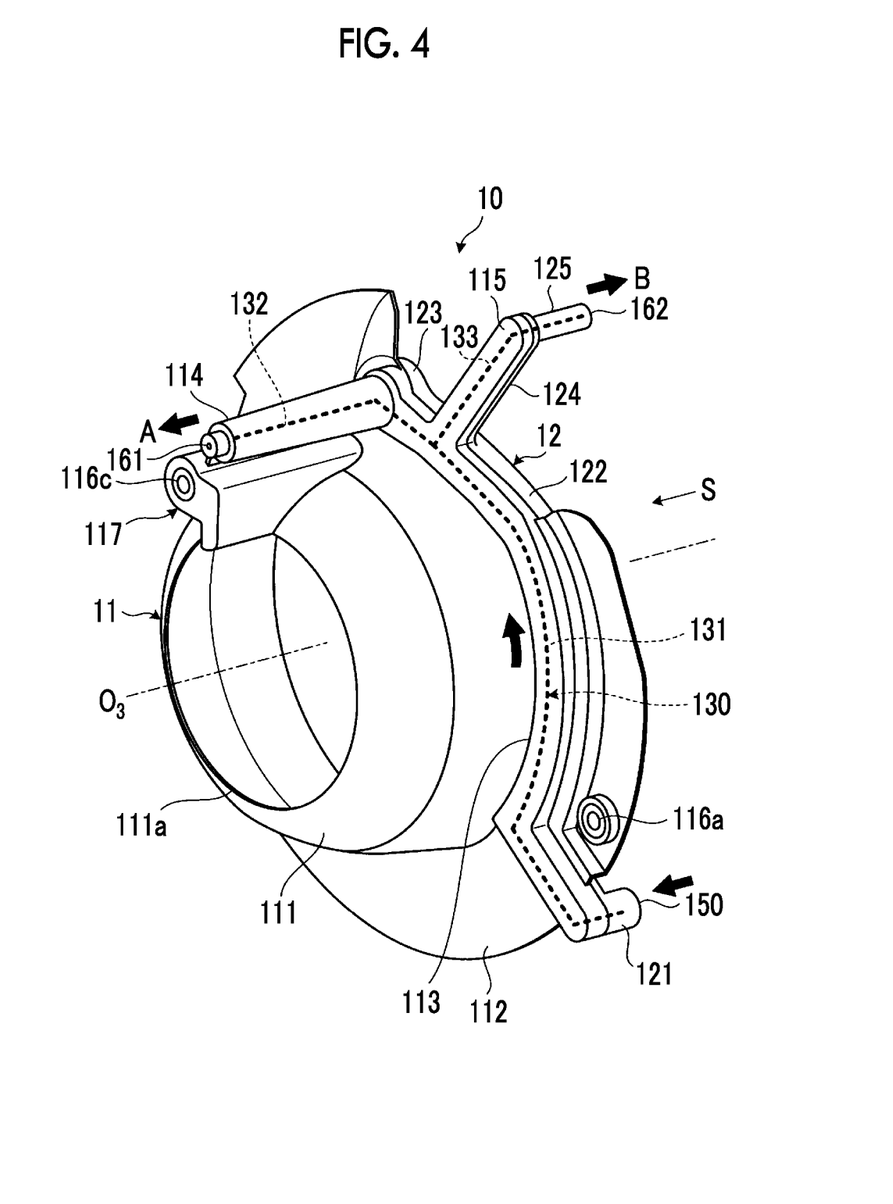
FIG. 4 is a perspective view schematically illustrating the baffle plate.
Figure 5:
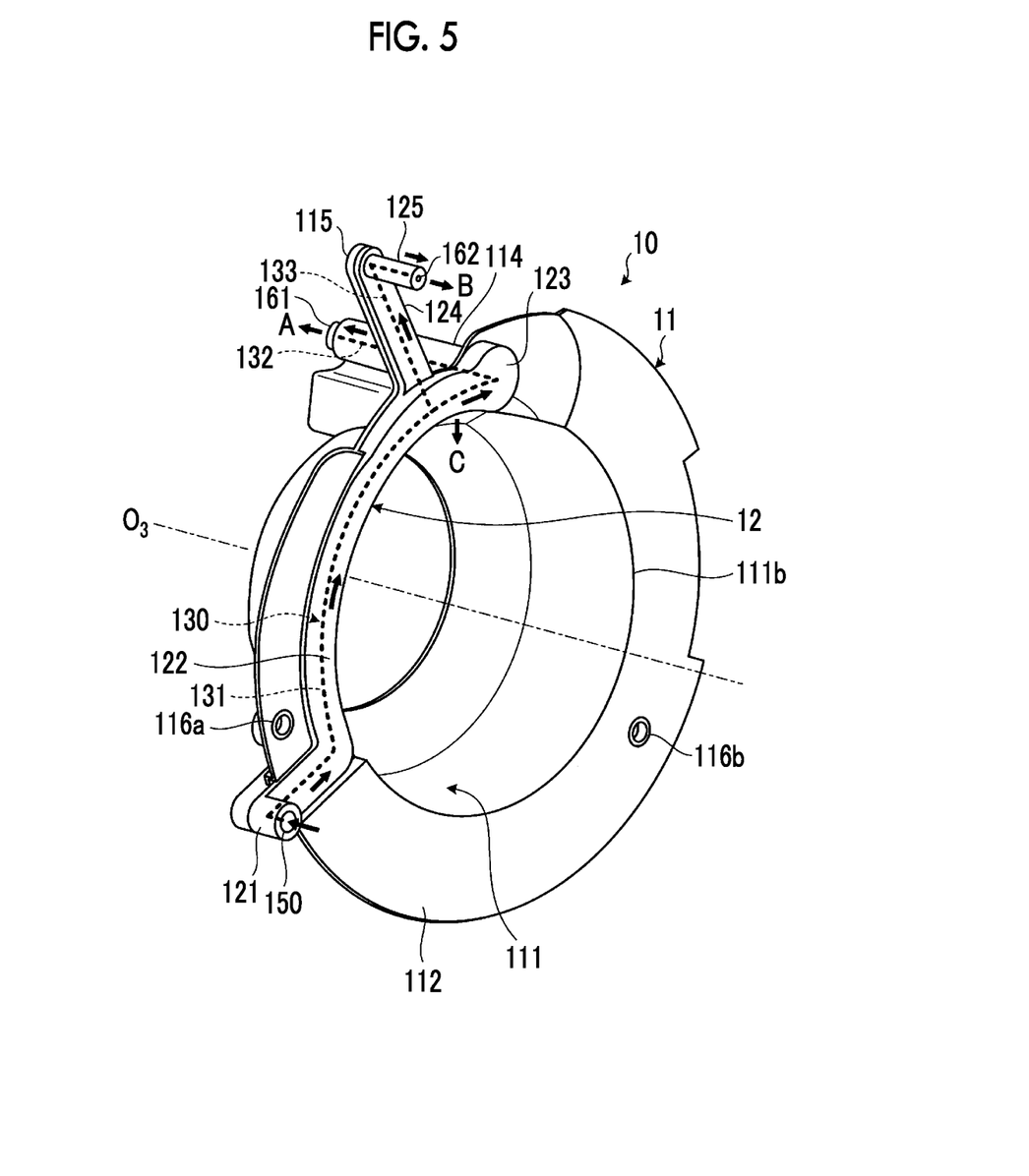
FIG. 5 is a perspective view schematically illustrating the baffle plate as seen from an S direction of FIG. 4.
Figure 6:
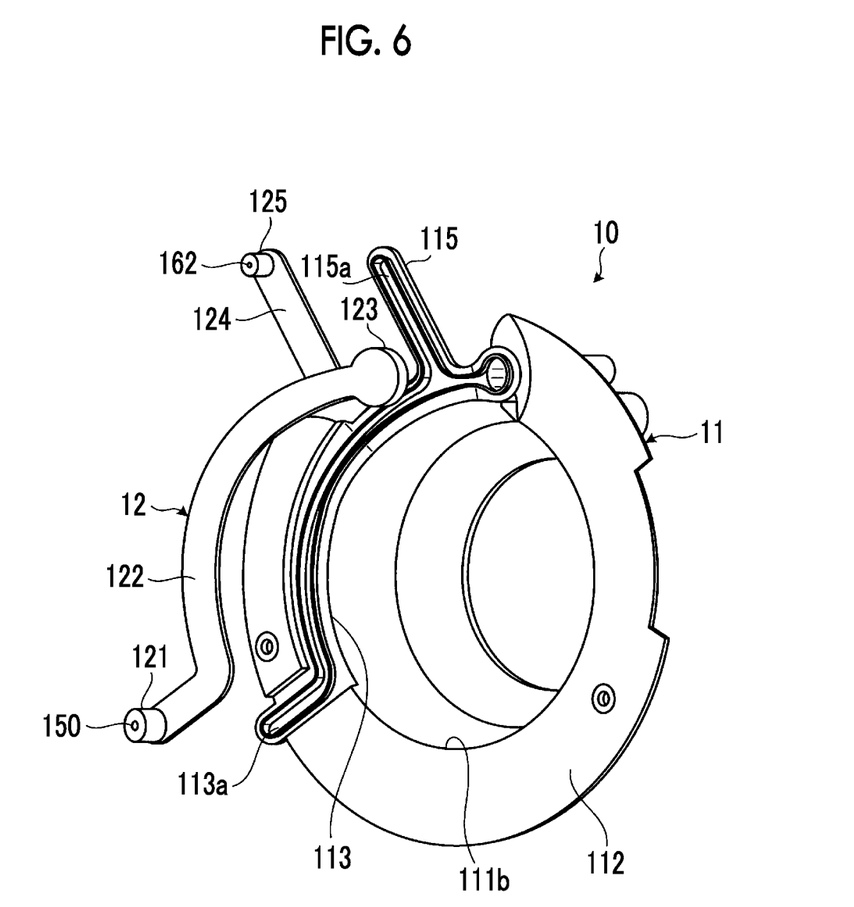
FIG. 6 is an exploded perspective view of the baffle plate.
Figure 7:
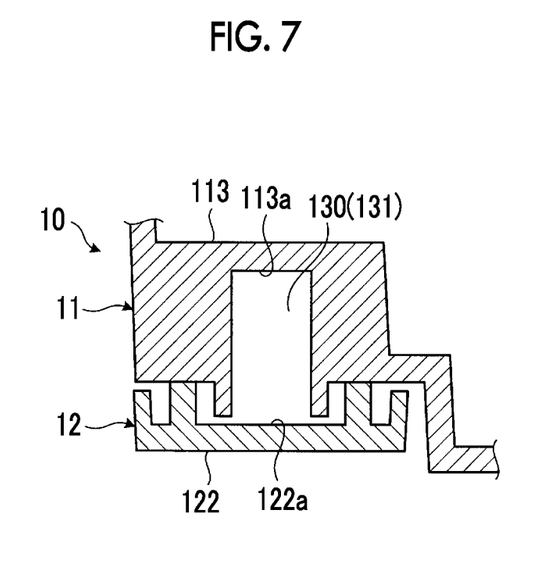
FIG. 7 is a sectional view of a plate oil passage.
Figure 8:
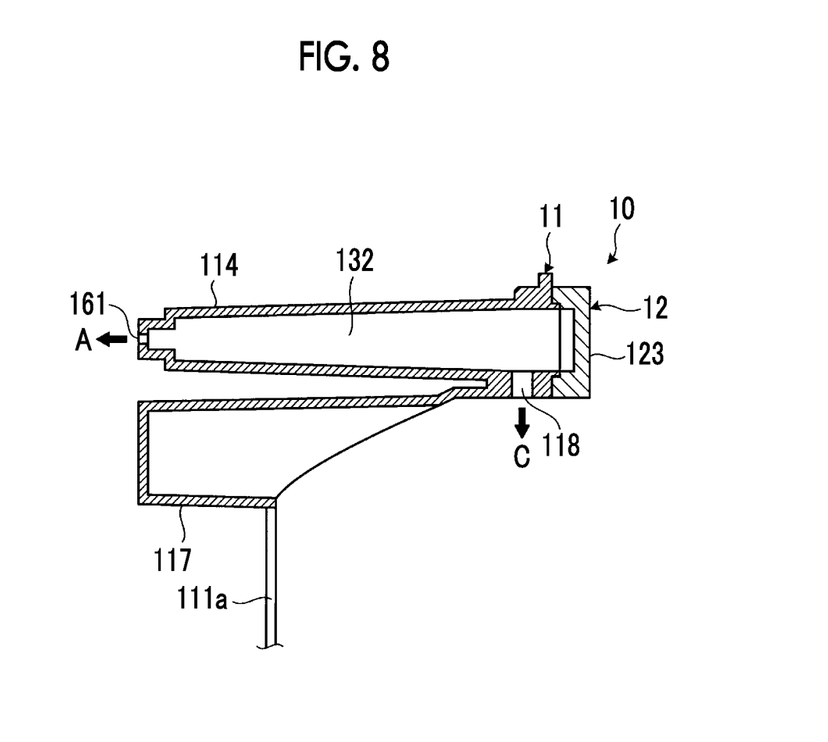
FIG. 8 is a sectional view for illustrating a third discharge port of the baffle plate.

The structure of the baffle plate 10 will be described in detail with reference to FIGS. 4 to 8. FIG. 4 is a perspective view schematically illustrating the baffle plate 10. FIG. 5 is a perspective view schematically illustrating the baffle plate 10 as seen from an S direction of FIG. 4. FIG. 6 is an exploded perspective view of the baffle plate 10. FIG. 7 is a sectional view of the plate oil passage 130. FIG. 8 is a sectional view for illustrating the third discharge port of the baffle plate 10. In addition, here, "the axial direction of the third axis $O_3$" is simply described as an "axial direction", and is described as a radial direction and a circumferential direction with the third axis $O_3$ as a reference.

The baffle plate 10 includes a tubular plate body 11 that is a first member, and a bent plate-shaped auxiliary member 12 that is a second member. Both the plate body 11 and the auxiliary member 12 are plate-shaped members made of resin, and are integrated with each other by being superposed with each other and vibration-welded to each other. The plate oil passage 130 is formed by the superposing between the plate body 11 and the auxiliary member 12. In this way, by superposing two members of the plate body 11 and the auxiliary member 12 with each other to manufacture the baffle plate 10, it becomes easy to form the plate oil passage 130 in the baffle plate 10.

The plate oil passage 130 includes a first oil passage 131 that communicates with the supply port 150, a second oil passage 132 that communicates with the first discharge port 161, and a third oil passage 133 that communicates with the second discharge port 162. The first oil passage 131 and the third oil passage 133 are formed by an oil passage groove formed in the plate body 11, and an oil passage groove formed in the auxiliary member 12. The second oil passage 132 is formed by the plate body 11.

In detail, the plate body 11 includes a tubular part 111, a flange part 112, a first oil passage forming part 113 that is a portion for forming the first oil passage 131, a second oil passage forming part 114 that is a portion for forming the second oil passage 132, and a third oil passage forming part 115 that is a portion for forming the third oil passage 133.

The tubular part 111 constitutes a main body of the plate body 11, and is formed in a dome shape that opens on both sides in a height direction (axial direction). The tubular part 111 is provided with a first opening 111a opening to a top side in the dome shape and a second opening 111b opening to a bottom side in the dome shape. Both the openings 111a, 111b are formed in a circular shape, and the first opening 111a has a smaller diameter than the second opening 111b. That is, the tubular part 111 is reduced in diameter with a plurality of steps or gradually from the second opening 111b on the bottom side in the dome shape toward the first opening 111a on the top side in the dome shape. In a state where the baffle plate 10 is attached to the case 2, the tubular part 111 functions as a partition wall that restricts the flow of oil between the case 2 and a lubrication-needing site (for example, the differential gear mechanism 5).

The flange part 112 is a fixing part attached to the case 2, and is a positioning part of the baffle plate 10. As illustrated in FIGS. 4 and 5, the flange part 112 protrudes radially outwardly from the second opening 111b, and extends in the circumferential direction. A first bolt hole 116a and a second bolt hole 116b are provided at positions with a predetermined spacing from each other in the circumferential direction in the flange part 112. Bolts for being fixed to the case 2 are threadedly engaged with the bolt holes 116a, 116b.

The first oil passage forming part 113 is a portion that forms the first oil passage 131, and is a portion to which the auxiliary member 12 is welded. As illustrated in FIGS. 4 to 6, the first oil passage forming part 113 is formed in the flange part 112, and includes a main portion that extends in the circumferential direction on the bottom side of the tubular part 111, and an introduction portion that extends radially outwardly from an end of the main portion. Additionally, as illustrated in FIGS. 6 and 7, a recess 113a is provided in a superposed surface (welding surface) with the auxiliary member 12 in the first oil passage forming part 113. The recess 113a is an oil passage groove that forms the first oil passage 131, and extends in the circumferential direction.

The second oil passage forming part 114 is a portion that forms the second oil passage 132. As illustrated in FIG. 4, the second oil passage forming part 114 is a tubular protruding part that is formed in series with the first oil passage forming part 113 and protrudes from the flange part 112 to the first opening 111a side (the axial direction). An internal space of the second oil passage forming part 114 constitutes the second oil passage 132, and has the first discharge port 161 opening to a tip part thereof. In a case where the baffle plate 10 is attached to the case 2, the first discharge port 161 is disposed at a position where oil is supplied to the first supply destination A. Additionally, the first discharge port 161 opens toward one side in the axial direction.

The third oil passage forming part 115 is a portion that forms the third oil passage 133, and is a portion to which the auxiliary member 12 is welded. As illustrated in FIGS. 4 and 5, the third oil passage forming part 115 is a linear plate part, and extends radially outwardly from the first oil passage forming part 113. As illustrated in FIG. 6, a recess 115a is formed in a superposed surface (welding surface) with the auxiliary member 12 in the third oil passage forming pan 115. The recess 115a is an oil passage groove that forms the third oil passage 133, and extends radially outwardly from the recess 113a of the first oil passage forming part 113. That is, the recess 115a of the third oil passage forming part 115 and the recess 113a of the first oil passage forming part 113 are connected together, and the recess 115a branches from the recess 113a.

Additionally, the plate body 11 is provided with a protruding part 117 that protrudes in parallel with the second oil passage forming part 114. The protruding part 117 has a third bolt hole 116c provided at a tip part thereof, and is a fixing part that is fastened to the case 2 with a bolt.

Moreover, as illustrated in FIG. 8, a through-hole 118 opening toward the inside of the tubular part 111 is formed in the second oil passage forming part 114. The through-hole 118 is the third discharge port that discharges the oil within the plate oil passage 130, and supplies oil to the differential pinion gear 53 and the differential side gear 54 that are the third supply destination C. In an example illustrated in FIG. 8, the oil within the second oil passage 132 is discharged from the through-hole 118 to the inside of the tubular part 111. That is, the plate oil passage 130 branches to an oil passage that leads from the supply port 150 to the first discharge port 161, and an oil passage that leads from the supply port 150 to the through-hole 118.

The auxiliary member 12 includes a supply part 121, a first oil passage auxiliary part 122, a communication part 123, a third oil passage auxiliary part 124, and a discharge part 125.

The supply part 121 is a portion that forms the supply port 150, and is formed in a cylindrical shape that extends in the axial direction. As illustrated in FIGS. 4 and 5, the supply part 121 has a tip part protruding further outward in the axial direction than the second opening 111b, and the supply port 150 opens to the tip part. Additionally, the supply port 150 opens toward the other side in the axial direction. That is, the supply port 150 opens in a direction opposite to the first discharge port 161 in the axial direction, and opens in the same direction as the second discharge port 162 in the axial direction. The supply part 121 is connected to the case 2, and communicates with the case oil passage 140.

The first oil passage auxiliary part 122 is a portion that forms the first oil passage 131, and is welded to the first oil passage forming part 113 of the plate body 11. As illustrated in FIGS. 5 and 6, the first oil passage auxiliary part 122 is a plate part that is bent in a substantial C-shape, and includes a main portion that extends in the circumferential direction along the second opening 111b, and an introduction portion that extends radially outwardly from an end of the main portion. The supply part 121 is provided on the tip side of the introduction portion. In this way, by forming the auxiliary member 12 in the circumferential direction, the rigidity of the baffle plate 10 can be enhanced by the rigidity of the auxiliary member 12. Additionally, as illustrated in FIG. 7, a recess 122a is provided in a superposed surface (welding surface) with the plate body 11 in the first oil passage auxiliary part 122. The recess 122a is an oil passage groove that forms the first oil passage 131, and extends in the circumferential direction. That is, the recess 122a of the first oil passage auxiliary part 122 is formed in a shape corresponding to the recess 113a of the first oil passage forming part 113.

The communication part 123 is a portion that allows the first oil passage 131 and the second oil passage 132 to communicate with each other, and is welded to the position of a bottom-side opening of the second oil passage forming part 114 in the plate body 11. As illustrated in FIGS. 5 and 6, in the auxiliary member 12, the supply part 121 is provided on one end side of the first oil passage auxiliary part 122, and the communication part 123 is provided on the other end side of the first oil passage auxiliary part 122. A recess closest to the downstream side of the first oil passage 131 is provided in a superposed surface (welding surface) with the plate body 11 in the communication pan 123. Additionally, the recess of the communication part 123 is formed to be broader than the recess 122a of the first oil passage auxiliary part 122.

The third oil passage auxiliary pan 124 is a portion that forms the third oil passage 133, and is welded to the third oil passage forming part 115 of the plate body 11. As illustrated in FIGS. 5 and 6, the third oil passage auxiliary part 124 is a linear plate part, branches and extends radially outwardly from the first oil passage auxiliary part 122. That is, the third oil passage auxiliary part 124 has a shape corresponding to the third oil passage forming part 115 on the plate body 11 side. Additionally, a recess is provided in a superposed surface (welding surface) with the plate body 11 in the third oil passage auxiliary part 124. The recess is an oil passage groove that forms the third oil passage 133, is connected to the recess 122a of the first oil passage auxiliary part 122, and linearly extends radially outwardly from the recess 122a.

The discharge part 125 is a portion that forms the second discharge port 162, and is formed in a cylindrical shape that extends in the axial direction. As illustrated in FIGS. 5 and 6, the discharge part 125 has a tip part protruding further outward in the axial direction than the second opening 111b, and the second discharge port 162 opens to the tip part. The discharge part 125 and the supply part 121 protrude in the same direction. In a case where the baffle plate 10 is attached to the case 2, the second discharge port 162 is disposed at a position where oil is supplied to the second supply destination B. That is, the second discharge port 162 opens to the other side in the axial direction, that is, in the direction opposite to the first discharge port 161 in the axial direction. For example, the discharge part 125 is inserted into the countershaft 41.

4. Flow of Oil

Here, the flow of oil by the plate oil passage 130 will be described. The oil, which has flowed into the plate oil passage 130 from the supply port 150, flows through the introduction portion of the first oil passage 131 radially inward. Then, the oil, which has flowed into the main portion from the introduction portion of the first oil passage 131, flows through the first oil passage 131 in the circumferential direction of the baffle plate 10. Since the baffle plate 10 is attached to the inner wall of the case 2 around the oil supply destination, the oil, which flows through the first oil passage 131, flows in the circumferential direction around the oil supply destination. Moreover, the oil, which flows through the main portion of the first oil passage 131, branches and flows to the second oil passage 132 side and the third oil passage 133 side in a branching position between the first oil passage 131 and the third oil passage 133.

The oil, which has flowed to the second oil passage 132 side from the branching position, flows into the second oil passage 132 via the communication part 123 from the first oil passage 131. Then, the oil, which has flowed into the second oil passage 132, is discharged from the first discharge port 161, or is discharged from the through-hole 118 that is the third discharge port. On the other hand, the oil, which has flowed from the branching position to the third oil passage 133 side, flows through the third oil passage 133 radially outward, and is discharged from the second discharge port 162.

Then, the oil discharged from the first discharge port 161 flows toward the first differential bearing 55A of the first supply destination A located outside the baffle plate 10. The oil discharged from the second discharge port 162 flows into the inside of the countershaft 41 included in the counter gear mechanism 4 of the second supply destination B located on the separate shaft. Since the first discharge port 161 and the second discharge port 162 open opposite to each other in the axial direction, the plate oil passage 130 can allow oil to be discharged in different directions in the axial direction. Additionally, the oil discharged from the through-hole 118, which is the third discharge port, flows toward the differential pinion gear 53 and the differential side gear 54 of the third supply destination C located inside the tubular part 111.

In this way, by providing the baffle plate 10 with the plate oil passage 130 common to the oil supply destinations and providing the first discharge port 161, the second discharge port 162, and the through-hole 118 that is the third discharge port in respectively different lubrication-needing sites, lubricating oil can be easily supplied to lubrication-needing sites that run short of the lubricating oil. Accordingly, the number of oil passages can be reduced while compensating for the shortage of lubricating oil in the lubrication-needing sites. For that reason, the manufacturing costs of the power transmission device 1 can be suppressed.

As described above, in the oil passage structure of the embodiment, the plate oil passage 130 that constitutes a portion of the supply oil passage 100 is formed in the baffle plate 10 attached to the inner wall of the case 2 around the oil supply destination. The plate oil passage 130 extends in the circumferential direction around the oil supply destination, and communicates with the discharge ports 161, 162 for supplying oil to the oil supply destination. For that reason, oil can be pumped to the oil supply destinations using the plate oil passage 130 that extends in the circumferential direction around the oil supply destination. Accordingly, the pressure loss of oil caused by the oil passage shape can be reduced. Additionally, it is possible to shorten the oil passage length of the supply oil passage 100, and the pressure loss of oil caused by the oil passage length can also be reduced. Also, the load of the mechanical oil pump 6 can be reduced by reducing the pressure loss in the supply oil passage 100. Moreover, since supply pipes to be disposed inside the case 2 can be reduced, the number of parts can be reduced, and the manufacturing costs can be reduced. In addition, the case 2 can be reduced in weight, that is, the power transmission device 1 can be reduced in weight. Accordingly, the fuel efficiency of a vehicle on which the power transmission device 1 is mounted can be improved.

In addition, the disclosure is not limited to the embodiment, and changes can be appropriately made without departing from the object.

The arrangement of the baffle plate 10 is not limited to a case where the baffle plate is provided between the case 2 and the differential case 51 on the third axis $O_3$. Although not illustrated, the baffle plate 10 may be provided on the second axis $O_2$ (on the second shaft $R_2$) that is provided with the countershaft 41.

Moreover, the power transmission device 1 is not limited to a case where the power transmission device is mounted on the FF vehicle, and may be mounted on a rear-engine, rear-wheel-drive type vehicle (RR vehicle). Moreover, the oil passage structure can be applied to a power transmission device in which a power source (for example, an electric motor) different from the engine and the counter gear mechanism are provided on the rear side. In a case where the oil passage structure is applied to the rear-engine, rear-wheel-drive type vehicle, the first discharge port 161 supplies oil to a differential gear mechanism on the rear side, and the second discharge port 162 supplies oil to a counter gear mechanism on the rear side. Alternatively, the oil passage structure can be applied to a power transmission device mounted on a front-engine, rear-wheel-drive type vehicle (FR vehicle). In a case where the oil passage structure is applied to the FR vehicle, the baffle plate 10 is disposed so as to cover the differential gear mechanism on the rear side. Then, oil is supplied from the first discharge port 161 to a differential bearing on the rear side, and oil is supplied from the through-hole 118 to a differential pinion gear and a differential side gear on the rear side.

Additionally, the plate body 11 and the auxiliary member 12 are not limited to a case where both are made of resin, and at least one member may be made of resin. For example, the plate body 11 may be made of metal, and the auxiliary member 12 may be made of resin. Alternatively, the plate body 11 may be made of resin, and the auxiliary member 12 may be made of metal. In this way, even in a case where one of the plate body 11 and the auxiliary member 12 is made of is metal, and the other is made of resin, it is possible to vibration-weld the plate body 11 and the auxiliary member 12 to each other. Moreover, the recesses that form the oil passage grooves may not be formed in both the plate body 11 and the auxiliary member 12. That is, a recess (oil passage groove) may be formed in at least one of a surface of the plate body and a surface of the auxiliary member 12 which face to each other such that the auxiliary member is interposed on the plate body 1.

Figure 9A:
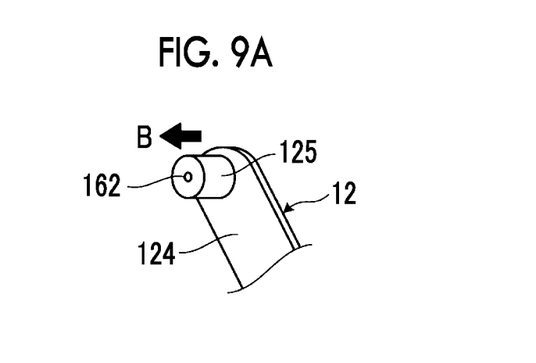
FIG. 9A is a schematic view for illustrating an orifice of a second discharge port.
Figure 9B:
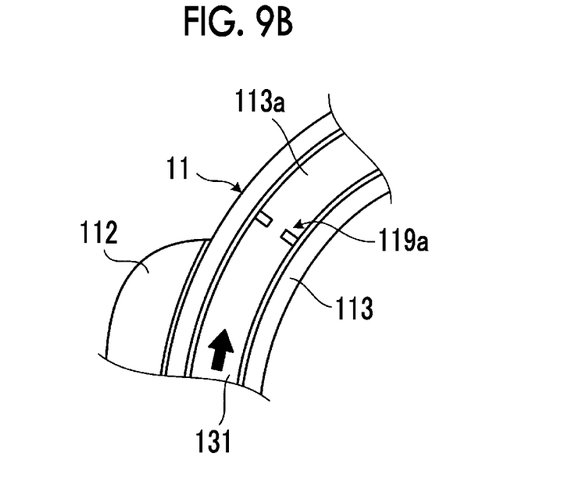
FIG. 9B is a schematic view for illustrating a choke structure of a first oil passage.
Figure 9C:
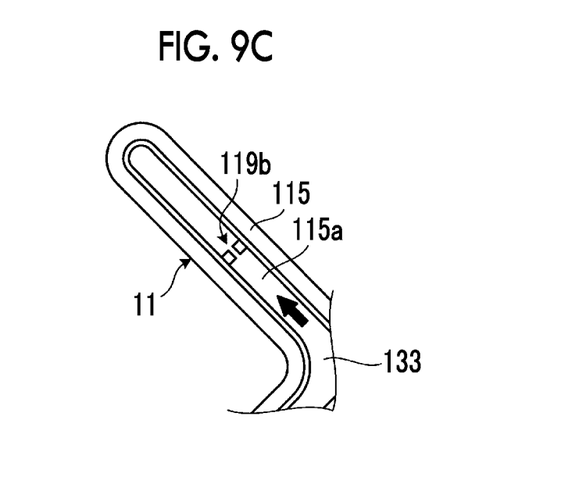
FIG. 9C is a schematic view for illustrating a choke structure of a third oil passage.

The plate oil passage 130 may be provided with an orifice and a choke structure for adjusting the flow rate of oil. For example, as illustrated in FIG. 9A, in the second discharge port 162, the opening may be constituted of an orifice. Alternatively, as illustrated in FIG. 9B, the recess 113a of the first oil passage forming part 113 may be provided with a choke structure 119a. Additionally, as illustrated in FIG. 9C, the recess 115a of the third oil passage forming part 115 may be provided with a choke structure 119b. The orifice and the choke structures 119a, 119b are integrally molded during molding of the plate body 11 or during molding of the auxiliary member 12. In addition, since at least one of the plate body 11 and the auxiliary member 12 is made of resin, an orifice and a choke structure are provided in a member made of resin in this case. In this way, in a case where one member is made of resin, manufacture becomes easier by providing an orifice and a choke structure in the plate body 11 or the auxiliary member 12 made of resin.

Additionally, in the supply oil passage 100, the oil supply destinations passing through the baffle plate 10 are not limited to the lubrication-needing sites, and may be a hydraulic actuator (not illustrated) provided in the power transmission device 1. That is, oil (hydraulic pressure) can be supplied to the hydraulic actuator via the plate oil passage 130 of the baffle plate 10. For example, a hydraulic actuator provided in a clutch or and a brake of the power transmission device 1 is used as the oil supply destination.

Moreover, the oil supply destinations in the plate oil passage 130 are not limited to a case where all the oil supply destinations are lubrication-needing sites. That is, both of a lubrication-needing site and a hydraulic actuator may be included in the oil supply destinations passing through the plate oil passage 130. For example, the oil pumped through the plate oil passage 130 is supplied from the first discharge port 161 to a lubrication-needing site that is the first supply destination A, and is supplied from the second discharge port 162 to a hydraulic actuator that is the second supply destination B. That is, one of the first discharge port 161 and the second discharge port 162 is provided at a position where oil is supplied to the lubrication-needing site, and the other is provided at a position where oil is supplied to the hydraulic actuator.

Figure 10:
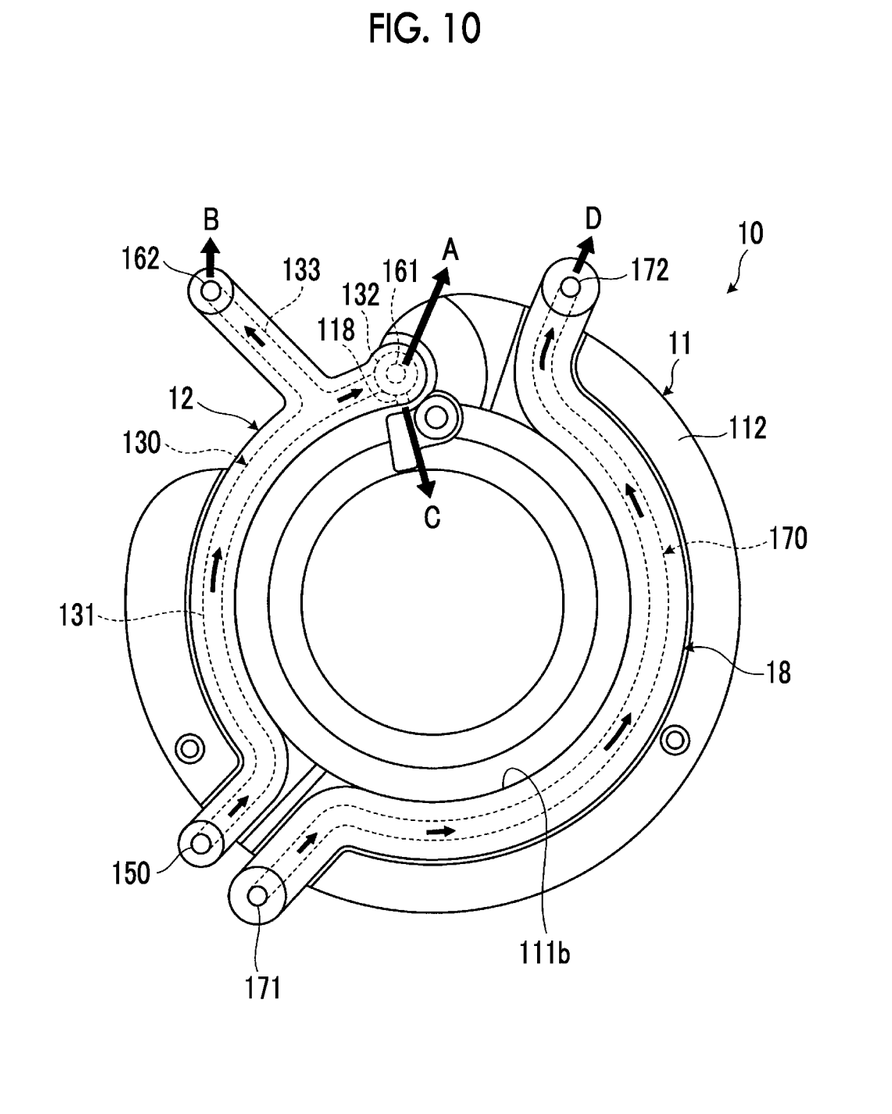
FIG. 10 is a schematic view for illustrating two independent plate oil passages.

Additionally, the baffle plate 10 may be provided with a plurality of independent plate oil passages. FIG. 10 is a schematic view for illustrating two independent plate oil passages. As illustrated in FIG. 10, a second plate oil passage 170 is provided in the baffle plate 10 separately from the plate oil passage 130. The second oil passage 170 is formed by an oil passage groove formed in the plate body 1, and an oil passage groove formed in the second auxiliary member 18. In this case, the second plate oil passage 170 is formed by integrating a bent plate-shaped second auxiliary member 18 with the flange part 112. The second auxiliary member 18 is a separate member from the auxiliary member 12. That is, the oil, which has flowed into the plate oil passage 130, does not flow through the second plate oil passage 170. The oil supplied from a second supply port 171 flows into the second plate oil passage 170, and the oil is discharged from a fourth discharge port 172. The second plate oil passage 170 is formed in a portion of the flange parts 112 where the plate oil passage 130 is not provided, and extends in the circumferential direction of the plate body 11. The fourth discharge port 172 is provided at a position where oil is supplied to a fourth supply destination D. The oil supply destinations (the first oil supply destination A, the second oil supply destination B, and the third oil supply destination C) of the plate oil passage 130 and the oil supply destination (the fourth oil supply destination D) of the second plate oil passage 170 may be either lubrication-needing portions or hydraulic actuators. For example, oil can be supplied to lubrication-needing sites (the first supply destination A, the second supply destination B, and the third supply destination C) via the plate oil passage 130, and hydraulic pressure can be supplied to a hydraulic actuator (the fourth supply destination D) via the second plate oil passage 170. Accordingly, in the baffle plate 10 disposed near the differential case 51, oil with different hydraulic pressures can be supplied to different oil supply destinations by causing oil to flow to the two plate oil passages 130, 170. In addition, although not illustrated, the second auxiliary member 18 may be a member molded integrally with the auxiliary member 12. In this case, the auxiliary member 12 is formed in a substantial U-shape including the shape of the second auxiliary member 18 illustrated in FIG. 10. By integrating the auxiliary member 12 with the flange part 112, the plate oil passage 130 and the second plate oil passage 170 are formed. In addition, an arrow from the first discharge port 161 to the first supply destination A illustrated in FIG. 10 is not for indicating the direction where oil is discharged from the first discharge port 161, that is, the position of the first supply destination A, and is for specifying a supply destination of oil discharged from the first discharge port 161. Similarly, an arrow from the second discharge port 162 to the second supply destination B and an arrow from the fourth discharge port 172 to the fourth supply destination D are not for indicating the discharge directions of oil or the positions of supply destinations, and are for specifying the relationships between the discharge ports and the supply destinations.

Additionally, the oil supply source may be an oil pump and may be an electric oil pump without being limited to the mechanical oil pump 6. Moreover, the arrangement of the electric oil pump is also not particularly limited.

What is claimed is:

1. An oil passage structure for a power transmission device, the oil passage structure comprising:
    a case provided to accommodate the power transmission device;
    a baffle plate attached to an inner wall of the case;
    an oil pump; and
    a supply oil passage through which oil is pumped from the oil pump to an oil supply destination via the baffle plate, wherein:
    the baffle plate includes
        a plate body, and
        an auxiliary member having a plate shape, the auxiliary member being superposed on and integrated with the plate body;
    the baffle plate has a plate oil passage, a supply port, and a discharge port, the plate oil passage being an oil passage that constitutes a portion of the supply oil passage and passes through an inside of the baffle plate, the supply port being configured to allow the oil discharged from the oil pump to flow into the plate oil passage through the supply port, and the discharge port being configured to allow the oil supplied to the oil supply destination, to be discharged from the plate oil passage through the discharge port; and
    the plate oil passage is defined by a recess provided in at least one of a surface of the plate body and a surface of the auxiliary member which face to each other such that the auxiliary member is interposed on the plate body.

2. The oil passage structure according to claim 1, wherein:
    the plate body has a tubular part, and a flange part that extends radially outwardly from the tubular part;
    the auxiliary member is superposed on and integrated with the flange part, and extends in a circumferential direction of the baffle plate; and
    the plate oil passage extends in the circumferential direction of the baffle plate, and the discharge port is provided at a position that is different in the circumferential direction of the baffle plate from a position at which the supply port is provided, such that oil is supplied to the oil supply destination.

3. The oil passage structure according to claim 1, wherein at least one of the plate body and the auxiliary member is a member made of resin, and an orifice or a choke structure is provided in a portion that forms the plate oil passage, in the member made of the resin.

4. The oil passage structure according to claim 1, wherein:
    the oil supply destination includes a first oil supply destination and a second oil supply destination at different positions inside the case;
    the discharge port includes a first discharge port that allows the oil supplied to the first oil supply destination to be discharged through the first discharge port, and a second discharge port that allows the oil supplied to the second oil supply destination to be discharged through second discharge port; and
    the plate oil passage branches to a second oil passage that leads from the supply port to the first discharge port, and a third oil passage that leads from the supply port to the second discharge port.

5. The oil passage structure according to claim 4, wherein:
    the plate oil passage is an oil passage that allows the oil to be supplied through to a lubrication-needing portion of the power transmission device where lubrication by the oil is needed;
    the first oil supply destination is a constituent element of a differential gear mechanism included in the power transmission device;
    the second oil supply destination is a constituent element separate from the differential gear mechanism in the power transmission device;
    the first discharge port is provided at a position where oil is directly supplied to the first oil supply destination; and
    the second discharge port is provided at a position where oil is directly supplied to the second oil supply destination.

6. The oil passage structure according to claim 5, wherein:
    the oil supply destination further includes a third oil supply destination that is a differential pinion gear and a differential side gear that constitute the differential gear mechanism;
    the discharge port further includes a third discharge port provided at a position where oil is directly supplied to the third oil supply destination;
    the plate oil passage branches to a second oil passage that leads from the supply port to the first discharge port, and a fourth oil passage that leads from the supply port to the third discharge port;
    the first oil supply destination is a differential bearing that supports a differential case accommodating the differential pinion gear and the differential side gear on the case; and
    the baffle plate is disposed so as to cover the differential case.

7. The oil passage structure according to claim 4, wherein:
    the plate oil passage is a lubricating oil passage that allows oil to be supplied through the lubricating oil passage to a constituent element of a differential gear mechanism included in the power transmission device, and an oil passage that allows hydraulic pressure of oil to be supplied through the oil passage to a hydraulic actuator included in the power transmission device;
    the baffle plate is provided on an axis where the differential gear mechanism is disposed;
    the first oil supply destination is a constituent element of the differential gear mechanism;
    the second oil supply destination is the hydraulic actuator; and
    the first discharge port is provided at a position where oil is directly supplied to the first oil supply destination.

8. The oil passage structure according to claim 4, wherein a direction in which the supply port opens is a direction opposite to a direction in which the first discharge port opens.

9. The oil passage structure according to claim 8, wherein a direction in which the supply port opens is the same as a direction in which the second discharge port opens.

10. The oil passage structure according to claim 1, wherein:
    the baffle plate has a second plate oil passage that is an oil passage independent from the plate oil passage, the second plate oil passage allowing oil to be pumped through the second plate oil passage to an oil supply destination different from the oil supply destination via the plate oil passage; and the second plate oil passage is defined by a recess provided in at least one of a surface of the plate body and a surface of the auxiliary member which face to each other such that the auxiliary member is interposed on the plate body.

* * * * *

UNITED STATES PATENT AND TRADEMARK OFFICE
CERTIFICATE OF CORRECTION

| | | |
|---|---|---|
| PATENT NO. | : 10,302,185 B2 | Page 1 of 1 |
| APPLICATION NO. | : 15/728538 | |
| DATED | : May 28, 2019 | |
| INVENTOR(S) | : Takaho Kawakami et al. | |

It is certified that error appears in the above-identified patent and that said Letters Patent is hereby corrected as shown below:

On the Title Page

Item (73), the Assignee's information is incorrect. Item (73) should read:
--(73) Assignees: TOYOTA JIDOSHA KABUSHIKI KAISHA, Toyota-shi (JP)
　　　　　　　TOYODA GOSEI CO., LTD., Kiyosu-shi (JP)--

Signed and Sealed this
Ninth Day of February, 2021

Drew Hirshfeld
*Performing the Functions and Duties of the
Under Secretary of Commerce for Intellectual Property and
Director of the United States Patent and Trademark Office*